PULSE COMMUNICATION SYSTEM

Filed June 15, 1953

INVENTOR
ARNOLD M. LEVINE
BY Percy P. Lantzy
ATTORNEY

United States Patent Office 2,852,610

Patented Sept. 16, 1958

2,852,610

PULSE COMMUNICATION SYSTEM

Arnold M. Levine, River Edge, N. J., assignor to International Telephone and Telegraph Corporation, a corporation of Maryland Application June 15, 1953, Serial No. 361,664

19 Claims. (Cl. 179—15.6)

Figure 1:
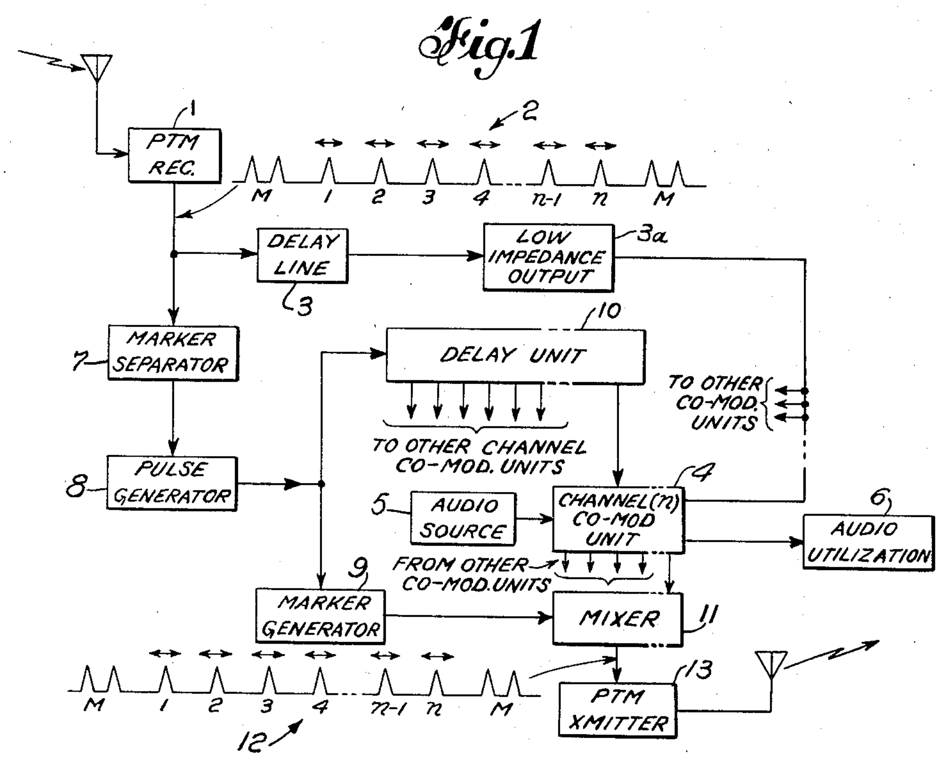

This invention relates to pulse communication systems and more particularly to means incorporated in a PTM (pulse time modulation) communication terminal or repeater station for achieving both a modulation of an intelligence channel in a pulse train being transmitted and a demodulation of a corresponding intelligence channel in a pulse train being received.

In terminal equipment of a PTM communication system wherein the intelligence is conveyed by a sequence of pulse trains having a marker or reference signal followed by a plurality of interleaved time modulated channel pulses, it has been the practice in the past to employ a separate circuit arrangement to modulate the various channels of a pulse train being transmitted and a separate circuit arrangement for demodulating the various channels of a pulse train being received, relatively independent of each other. This type of circuit arrangement has also been employed with slight modifications thereof in repeater stations having a suitable number of these combinations to handle intelligence traffic or to handle two-way intelligence traffic including drop and insert channel equipment as designated ones of such repeater stations.

It is an object of this invention to provide a PTM station (terminal or repeater) performing both the modulation of the channel pulses of a pulse train being transmitted and demodulation of corresponding channel pulses of a pulse train being received in a manner to minimize duplication of equipment heretofore believed necessary.

Another object of this invention is the provision of a PTM terminal having circuit means associated with each of the channels therein to modulate a quiescent channel pulse as established by timing means keyed by the marker pulse of the received pulse train and to demodulate the corresponding channel pulse carried by the received pulse train subsequent thereto.

A feature of this invention is the provision of a PTM terminal capable of handling a plurality of two way communications, each communication being carried on a single channel of a pulse train including in combination a means to receive a sequence of PTM pulse trains, a plurality of co-mod units (the term "co-mod" herein being employed to mean a single circuit for performing both the functions of modulation and demodulation of outgoing channel pulses and incoming channel pulses, respectively, of a single communication channel of a multichannel two way communication system), a first means coupled to said receiving means for applying said PTM pulse trains to each of said co-mod units with a predetermined time delay, a second means coupled to said receiving means for producing a keying signal corresponding to the marker signal of said pulse trains, and timing means responsive to said keying signal having a plurality of connections spaced in time to establish the corresponding channel pulses for a transmission pulse train. Coupled to each of the taps of said timing means are respective ones of said co-mod units having associated therewith an audio signal source and an audio utilization device whereby the respective channel pulse of said timing means is modulated in accordance with the signal of said audio signal source and said utilization device responds to the signal obtained by the subsequent demodulation therein of the incoming channel pulses of the corresponding communication channel of a received pulse train, the signal of said audio source and the modulation of said incoming channel pulse of corresponding communication channels are not normally present simultaneously in said co-mod unit.

Another feature of this invention is the provision of a plurality of multivibrator circuits incorporated in a PTM terminal having one stable condition and one unstable condition, each of said circuits being associated with an intelligence channel of the communication system having means for modulating a channel signal for transmission in accordance with a signal of a audio sigal source associated therewith and means for demodulating a corresponding channel signal of a received pulse train subsequent to modulation of the corresponding channel signal for transmission and preceding the modulation of the next channel signal carried by the transmission pulse train for utilization in an audio utilizing device coupled to said multivibrator circuit.

Figure 2:
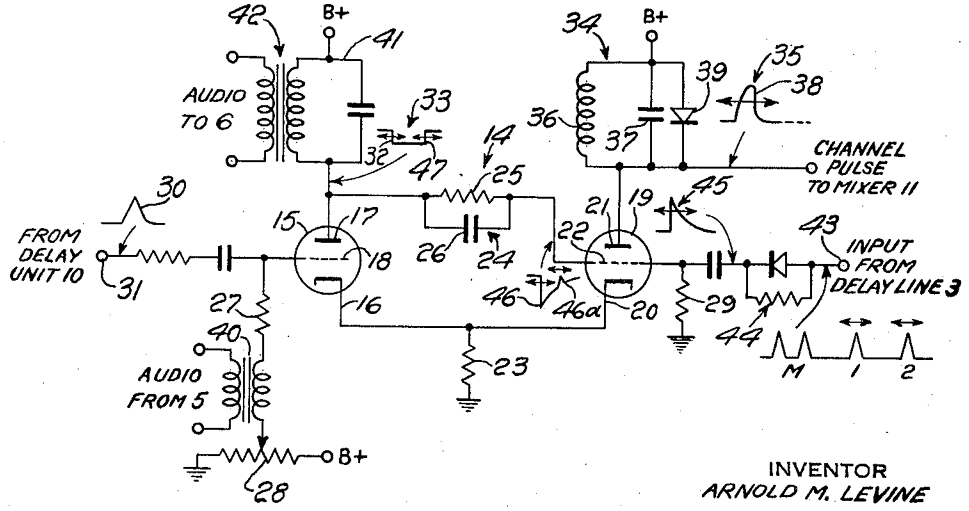

The above-mentioned and other features and objects of this invention will become more apparent by reference to the following description taken in conjunction with the accompanying drawings, in which:

Fig. 1 is a block diagram of a PTM communication system following the principles of this invention; and Fig. 2 is a schematic diagram illustrating in detail the circuitry of a single co-mod unit as employed in the system of Fig. 1.

Referring to Fig. 1, PTM terminal equipment is illustrated as comprising a conventional receiver 1 capable of receiving a pulse communication signal wave and delivering a sequence of PTM pulse trains as illustrated in waveform 2 having a marker pulse M followed by a plurality of interleaved time modulated channel pulses. The output of receiver 1 is coupled to a delay line 3 and a low impedance output device 3*a* utilized to couple the signal as represented in waveform 2 to each of the plurality of co-mod units, represented by co-mod unit 4 which has associated therewith an audio source 5 and an audio utilization device 6. The received pulse train as represented by waveform 2 is further coupled to a marker separator 7 which is responsive to the marker pulse M for production of a waveform to activate pulse generator 8 for production of a triangular or sawtooth shaped keying signal at the outputs thereof having a predetermined repetition rate, such as 8 kc. in a 23 channel PTM system. The output of pulse generator 8 is applied to a marker generator 9 for production therein of a marker pulse to be employed as the reference signal in the pulse trains to be transmitted from this terminal equipment. Representative circuitry and operating principles of the circuit components of the separator 7, generator 8 and generator 9, are disclosed in detail in the patent of D. D. Grieg #2,385,591, as well as the patents and applications therein cited.

The triggering signal output of pulse generator 8 is also applied to a timing means including a delay unit 10 having predeterminedly located connections therealong spaced in time for establishing a time sequence of channel pulses to be eventually mixed with a marker signal of marker generator 9 to produce the transmitted pulse train. Associated with each one of the channel taps or connections of delay unit 10 is an identical co-mod unit, such as unit 4, wherein the channel pulse as established by delay unit 10 is modulated by modulating means in accordance with a signal from the audio source 5 and coaction of demodulating means therewith performs the function of demodulating the corresponding channel pulse of the received pulse train. The corresponding channel pulse is coupled from delay line 3 having a delay time sufficient to position in time said corresponding channel pulse for application to co-mod unit 4 subsequent to the modulation of the quiescent channel pulse from delay unit 10 and prior to the modulation of the succeeding channel pulse established by delay unit 10. The signal recovered in the demodulation process in unit 4 is coupled to audio utilization device 6 which may include a speaker system or the like.

The time sequential modulated outputs of each of the plurality of co-mod units are applied to mixer 11 in a manner whereby a pulse train of channel pulses having a predetermined time relationship with respect to the marker signal of marker generator 9 is established, as indicated by waveform 12. The output of mixer 11 is appropriately coupled to a conventional PTM transmitter 13 for ultimate transmission along the path of intelligence communication as may be established by a direct radio link between terminal stations, or with repeater stations interposed therebetween.

Fig. 2 illustrates in detail one of a plurality of identical channel co-mod (modulation-demodulation) units as represented by unit 4 of Fig. 1. This unit is illustrated as essentially comprising a driven multivibrator 14 including a normally non-conductive electron discharge device 15 having at least a cathode 16, an anode 17 and a control grid 18 coupled to a normally conductive electron discharge device 19 having at least a cathode 20, and anode 21 and a control grid 22 by means of a common cathode resistor 23 and a time constant network 24 including resistor 25 and capacitor 26. Electron discharge device 15 is maintained in a non-conductive condition by bias resistor 27 and 28 in cooperation with the voltage developed across the common cathode resistor 23 as produced by conduction of electron discharge device 19 made conductive by the bias established by resistor 29 coupled to grid 22.

First, let us consider the establishment of outgoing channel pulses containing no modulation. This is achieved by applying pulse 30 having a triangular or sawtooth waveform from delay line 10 through terminal 31 to grid 18. The application of pulse 30 to grid 18 will cause device 15 to become conductive, the level at which pulse 30 causes conduction therein being determined by appropriate positioning of variable resistor 28. The conduction of device 15 establishes the quiescent position of the leading edge 32 of the anode waveform 33, said quiescent position of the leading edge 32 being determined by a setting of resistor 28.

The conduction of electron discharge device 15 will cause electron discharge device 19 to become non-conductive which will excite the ringing circuit 34 disposed in the anode circuit of electron discharge device 19 establishing a channel pulse 35 having a predetermined width as established by the resonant frequency of ringing circuit 34, said resonant frequency being determined by the values of inductance 36 and capacitor 37 forming the resonant circuit thereof. If the action of the ringing circuit were allowed to continue during the period when multivibrator 14 is in its unstable condition, as determined by the time constant of network 24, oscillations or overshots will occur following the trailing edge 38 of channel pulse 35, the first half cycle of oscillations in the resonant circuit. However, there is provided in a shunt relationship with inductance 36 and capacitor 37 a diode 39 which will substantially dampen the oscillations or overshots normally occurring in a ringing circuit.

Having now established the width and quiescent time position of channel pulse 35 it is now necessary to describe the operation of modulating this channel pulse in accordance with the audio signal of source 5. A signal from source 5 is coupled through audio transformer 40 to the grid 18 in a manner to be superimposed upon the quiescent pulse output 30 of delay line 10 whereby the audio signal will add or subtract from the voltage of pulse 30 to cause device 15 to become conductive sooner or later than when pulse 30 is applied to grid 18 alone. The superimposition of the audio signal upon pulse 30 causes the leading edge of the anode waveform 33 to occur in time according to the instantaneous amplitude of the audio signal. This modulation or audio component is coupled to the grid 22 of device 19 and hence causes a ringing of circuit 34 to alter the relative time position of pulse 35 in accordance with the signal applied from audio source 5. During this modulation process where leading edge 32 of waveform 33 is modulated in accordance with the signal from source 5, the anode circuit of device 15 having therein a differentiating type of circuit 41 responsive to the audio component carried by waveform 33 will differentiate the leading edge 32 thereof in a manner to couple this audio component through audio transformer 42 to the utilization device 6 such that talk back will occur enabling the sender to hear what he is sending.

Having now established the operation of the modulating means of the co-mod unit 4, the operation of the demodulation of the co-mod unit 4 will now be discussed, remembering that normally a message will travel in only one direction at a time, either into the terminal or out of the terminal in a communication channel of this type for carrying a two way conversation. As hereinabove stated, the time constant of network 24 determines the length of time during which multivibrator 14 will remain in its unstable condition. The corresponding channel pulse of the received pulse train 2 from delay line 3 is coupled through terminal 43 to the differentiating circuit 44 for developing an expanded channel pulse 45 carrying therewith the audio component placed thereon at a distant terminal or by the insert channel equipment of an intermediate repeater.

Channel pulse 45, corresponding to the identical channel represented by the outgoing channel pulse 35 causes electron discharge device 19 to again become conductive. However, due to the time delay imposed by delay unit 3 the grid waveform 46 is caused to reach the voltage level of conduction sooner by the superimposition of pulse 45 thereupon as indicated by pip *46a*. The reaching of the conduction state of device 19 will vary in time depending upon the modulation carried by pulse 45, if a message is being received, otherwise conduction of device 19 will occur at the quiescent time of pulse 45. The conduction of device 19 will cause device 15 to again become non-conductive forming the trailing edge 47 of waveform 33, sooner than normal and at varying times for production of a width modulated pulse, said width modulation being determined by the modulation carried by the incoming channel pulse 45.

As before the anode circuit 41 will differentiate the width modulated pulse for extracting the audio component therefrom for impression upon audio utilization device 6 enabling an interpretation and understanding of the intelligence carried by the particular channel in question included in the received pulse train. As in the case of the leading edge 32 of waveform 33 the outgoing channel pulse 35 has impressed thereupon a certain amount of the audio component of the corresponding incoming channel pulse 45 such that the person transmitting intelligence upon pulse 45 receives talk back which will enable him to hear what he has transmitted.

The talk back occurring in both the modulation and the demodulation process, much like that occurring in telephone hand sets of today, is not detrimental to the modulation and demodulation of corresponding outgoing and incoming channel pulses, respectively, since it is advantageous for the person sending information to be able to hear what he is sending. There will be substantially no cross-talk between the outgoing and incoming channel pulses since, as in a telephone conversation, a message is being sent in only one direction at a time. However, if a message is sent in both directions simultaneously the messages will be distinguishable from each other due to the predetermined time displacement existing between the coactive operations of the co-mod unit as provided by the time delay impressed upon the received pulse train by delay line 3.

Although the above description has primarily been concerned with the operation of this co-mod unit in terminal equipment wherein an audio signal modulates each of the channel pulses established in delay unit 10 through cooperation of the marker signal of pulse train 2 with a signal different than the signal carried by the corresponding channel pulses of pulse train 2. It is within the scope of this invention to incorporate such co-mod units in repeater equipment wherein a pulse train is operated upon in a manner following the principles of this invention to accomplish the desired relay, or may be modified to provide a means for incorporating drop channel and insert channel equipment as desired at designated repeater stations in a predetermined transmission link.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse communication system comprising a source of incoming time modulated pulses of a communication channel and a synchronizing signal, delay means coupled to said source for delaying a predetermined amount said incoming pulses, means coupled to said source for production of a keying signal corresponding to said synchronizing signal, means responsive to said keying signal to produce quiescent outgoing pulses of a corresponding communication channel, a trigger circuit including a modulating portion and a demodulating portion coupled in a dependent relationship, an audio signal source coupled to the modulating portion of said trigger circuit, means coupling said outgoing pulses to the modulating portion of said trigger circuit for modulation thereof in accordance with the signal of said audio signal source, means coupling the output of said delay means to the demodulating portion of said trigger circuit to demodulate said incoming pulses alternately with the modulation of said outgoing pulses.

2. A system according to claim 1, wherein said trigger circuit includes a first electron discharge device, a second electron discharge device, each of said devices having at least an anode, a cathode and a control grid, and circuit means interconnecting said first and said electron discharge device to form a multivibrator type of circuit.

3. A system according to claim 2, wherein said circuit means includes an impedance common to the cathode of each of said electron discharge devices, biasing networks coupled to the grid of each of said devices, and a time constant network coupling the anode of said first device to the control grid of said second device.

4. A system according to claim 2, wherein said modulating portion includes said first electron discharge device, said time constant network, and a ringing circuit disposed in the anode circuit of said second electron discharge device whereby said quiescent outgoing pulse causes conduction of said first device and non-conduction of said second device to excite said ringing circuit, the timing of the changing in conduction conditions varying in accordance with the signal of said audio source for modulation of said outgoing pulses.

5. A system according to claim 4, wherein said ringing circuit comprises a resonant circuit tuned to a frequency sufficient for providing a predetermined width for said outgoing pulses and a crystal diode disposed in shunt relation therewith to substantially eliminate the effect of oscillations of said resonant circuit following the first half cycle of oscillation.

6. A system according to claim 4, wherein said demodulating portion includes said second electron discharge device, said time constant network, and an audio detecting means disposed in the anode circuit of said first electron discharge device whereby the incoming pulses of the corresponding communication channel returns said first and second discharge device to their respective non-conductive and conductive condition at a time dependent upon the modulation of said incoming pulses, the audio component present on said incoming pulses being detected by said detecting means for utilization thereof.

7. A multiplex pulse communication system comprising a source of interleaved time modulated channel pulses including a marker signal, delay means coupled to said source for delaying said channel pulses by a predetermined amount, means coupled to said source to produce a keying signal corresponding to said marker signal, timing means responsive to said keying signal having a plurality of connections therealong spaced in time to establish a sequence of quiescent channel pulses for transmission, a plurality of trigger circuits each including a modulating portion and a demodulating portion coupled in a dependent relationship, an audio signal source coupled to the modulating portion of each of said trigger circuits, means coupling the modulating portion of each of said trigger circuits to respective ones of the spaced connections of said timing means for modulation of the respective quiescent channel pulses in accordance with the signal of said audio signal source, mixing means coupled to the output of the modulating portion of said trigger circuits and said means to produce a keying signal to establish a pulse train for transmission having interleaved time modulated channel pulses including a marker signal, an audio output connection for the demodulating portion of each of said trigger circuit and means coupling the output of said delay means to the demodulating portion of each of said trigger circuits to demodulate channel pulses of said source of interleaved time modulated channel pulses for utilization at said audio output connection alternately with the modulation of the corresponding quiescent channel pulses.

8. A system according to claim 7, wherein each of said trigger circuits includes a multivibrator type of circuit having a normally non-conductive electron discharge device and a normally conductive electron discharge device, each of said devices having at least an anode, a cathode and a control grid, and an impedance disposed in common relationship with the cathodes of each of said electron discharge devices.

9. A system according to claim 8, wherein said multivibrator type of circuit further includes a time constant network coupling the anode of said first device to the control grid of said second device for control of the time duration during which said multivibrator will remain in an unstable condition.

10. A system according to claim 9, wherein said modulating portion includes said normally non-conductive electron discharge device, said time constant network, and a ringing circuit disposed in the anode circuit of said normally conductive electron discharge device whereby respective ones of said quiescent channel pulses causes conduction of said normally non-conductive device and non-conduction of said normaly conductive device to ring said ringing circuit, the timing for the ringing of said ringing circuit being dependent upon resultant voltage realized when the signal of said audio source is superimposed upon respective ones of said quiescent channel pulses for modulation thereof.

11. A system according to claim 10, wherein said ringing circuit comprises a parallel arrangement of an inductance, a capacitor and a crystal diode, said inductance and capacitor providing a predetermined resonant frequency to establish the width of the modulated quiescent channel pulse and said crystal diode substantially eliminating the overshots of said ringing circuit.

12. A system according to claim 10, wherein said demodulating portion includes said normally conductive electron discharge device, said time constant network, and audio detecting means situated in the anode circuit of said normally non-conductive electron discharge device coacting with said modulating means in a manner whereby a channel pulse of said source coresponding to the respective one of said quiescent channel pulses returns said non-conductive and said conductive discharge devices to their respective stable conditions at a time dependent upon the modulation of the channel pulse of said source to obtain the audio component thereof by said detecting means for utilization in said utilizing device.

13. In a pulse communication system, a source of repetitious quiescent channel signals, an audio signal source, a trigger circuit including a modulating portion and a demodulating portion coupled in a dependent relationship, means coupling said channel signal source to the modulating portion of said trigger circuit for modulation thereof with the signal of said audio source, a source of repetitious incoming modulated channel signals, means coupling said incoming channel signals to the demodulating portion of said trigger circuit for demodulation thereof alternately with the modulation of said quiescent channel.

14. In a system according to claim 13, wherein said modulating portion and said demodulating portion coact functionally and structurally to comprise a multivibrator type of circuit including a first electron discharge device and a second electron discharge device, each of said devices having at least an anode, a cathode and a control grid.

15. In a system according to claim 14, wherein the cathodes of said electron discharge devices are coupled to a common cathode impedance for maintaining said first electron discharge device normaly non-conductive and said second electron discharge device normally conductive.

16. In a system according to claim 15, wherein said modulating portion includes a signal path including said first electron discharge device, a time constant network coupled between the anode of said first electron discharge device and the control grid of said second electron discharge device, and a ringing circuit disposed in the anode circuit of said second electron discharge device so arranged that said quiescent channel signal and the signal of said audio source causes said first electron discharge device to be conductive and said second electron discharge device to be non-conductive for excitation of said ringing circuit to produce a modulated outgoing channel signal.

17. In a system according to claim 16, wherein said ringing circuit comprises a resonant circuit tuned to a frequency for achieving the desired width of said outgoing channel signal carrying the modulation of said audio source and a crystal diode in shunt relation with said resonant circuit for elimination of the spurious oscillations produced by said resonant circuit.

18. In a system according to claim 16, wherein said demodulating portion comprises a signal path including said second electron discharge device, said time constant network, and an audio detecting means disposed in the anode circuit of said first electron discharge device arranged in a manner to coact with said modulating means whereby said incoming time modulated channel signals of the corresponding communication channel returns said first and said second discharge devices to their original conditions of conduction at a time varied by the modulation carried by said incoming channel signal for removal of an audio component therefrom by said detecting means.

19. In a pulse communication system, a source of repetitious quiescent channel pulses, an audio signal source; a source of repetitious incoming time modulated channel signals; a trigger circuit including first and second translation devices each having at least first, second and third electrodes, a common impedance for the first electrode of each device to maintain said first device normally non-conductive and said second device normally conductive, a time constant network coupled between the third electrode of said first device and the second electrode of said second device, a ringing circuit coupled in the circuit of the third electrode of said second device, an audio detecting means disposed in the circuit of the third electrode of said first device; means coupling said source of quiescent channel pulses and said audio source to the second electrode of said first device where the respective signals of these sources cause said first device to be conductive and said second device to be non-conductive for excitation of said ringing circuit to produce a modulated outgoing channel signal therefrom; and means coupling said source of incoming channel signals to the second electrode of said second device where the incoming time modulated channel signals of the corresponding communication channel returns said first and second discharge devices to their original conditions of conduction at a time varied by the modulation carried by said incoming channel signal for removal of an audio component therefrom by said audio detecting means.

References Cited in the file of this patent

UNITED STATES PATENTS

| | | |
|---|---|---|
| 2,272,070 | Reeves | Feb. 2, 1942 |
| 2,541,076 | Labin et al. | Feb. 13, 1951 |
| 2,597,038 | Scully | May 20, 1952 |